Figure 1:
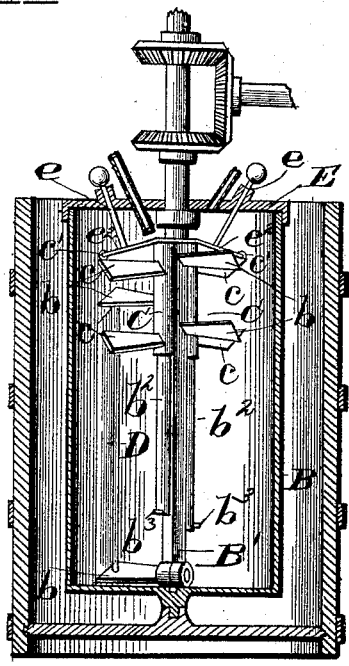

(No Model.)

T. S. LEWIS.
ICE CREAM FREEZER.

No. 474,475. Patented May 10, 1892.

Witnesses

Inventor
Thomas S. Lewis
by Edwin S. Clarkson
Attorney

UNITED STATES PATENT OFFICE.

THOMAS S. LEWIS, OF WILMINGTON, DELAWARE.

ICE-CREAM FREEZER.

SPECIFICATION forming part of Letters Patent No. 474,475, dated May 10, 1892.

Application filed July 23, 1891. Serial No. 400,422. (No model.)

*To all whom it may concern:*

Be it known that I, THOMAS S. LEWIS, a citizen of the United States, residing at Wilmington, in the county of New Castle and State of Delaware, have invented certain new and useful Improvements in Ice-Cream Freezers; and I do hereby declare the following to be a full, clear, and exact description of the invention, such as will enable others skilled in the art to which it appertains to make and use the same.

My invention relates to ice-cream freezers, but more particularly to the dasher thereof.

It consists of a dasher having a standard or axis of any desirable shape in cross-section, but preferably rectangular, having cast on opposite sides two or more paddles or blades. The other sides of the standard or axis are each provided with lugs or ribs integrally cast, one of which is slightly longer than the other. Working on these ribs or lugs are plates having cast integrally a series of blades or paddles, the uppermost of which have small apertures or eyes, which are engaged by spring-arms or their equivalent, said arms being secured to the standard near the top of the cream-receptacle.

Heretofore great difficulty has been experienced by manufacturers of ice-cream from the fact that all of the paddles of the dasher are rigidly cast with the standard. Consequently when the dasher is revolved at a high rate of speed, as they are in ice-cream factories, the cream is frequently churned into a solid lump of butter, and if this is not the case it will be found, as it has been in actual experience, that small lumps of butter will be distributed throughout the ice-cream, all of which is very objectionable to the consumer and detrimental to the manufacturer. Further, by having all of the paddles constantly agitating the cream prevents it from freezing rapidly.

The object of my invention is to obviate the above objections by casting ribs on the standard of the dasher and providing plates adapted to slide thereon, said sliding plates having paddles cast integrally therewith. I also secure spring-arms or their equivalent to the standard near the top of the cream-receptacle, which engage the paddles of the sliding plates and hold them up out of the cream. The scraper, which travels around the sides of the cream-receptacle, scrapes the frozen cream from the sides, and as soon as the cream has been frozen to a certain degree of solidity I drop a pin through an aperture in the cover of the cream-receptacle. The dasher continuing to revolve, the spring-arms strike against the said pin, and are thus released from the sliding plates, which upon being released fall of their own weight down into the partly-frozen cream. When ice-cream is thus made, it will be found that it is free from the objectionable lumps of butter, and, further, it will be finer.

Figure 2:
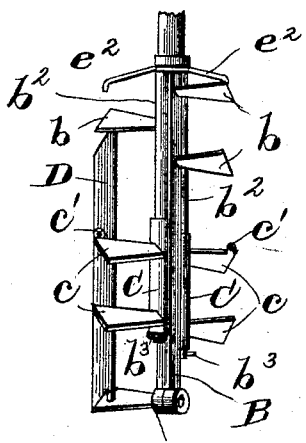
Figure 3:
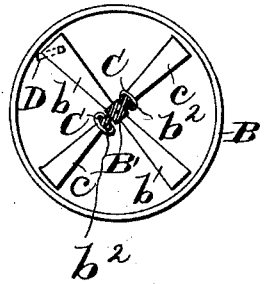
Figure 4:
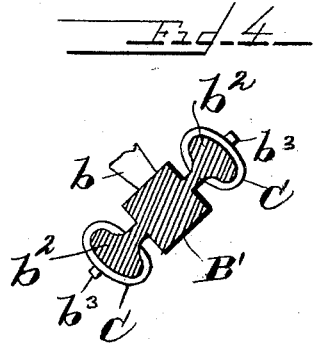

In the drawings, Figure 1 is a vertical central section through an ice-cream freezer with my invention attached. Fig. 2 is a detail view of my improved dasher. Fig. 3 is a top plan view of the cream-receptacle and dasher. Fig. 4 is a detail view.

A is the ice-receiving tub, and B the cream-receptacle. Working in the cream-receptacle is the stand B', having integrally-cast paddles $b$ $b$.

$b^2$ $b^2$ are ribs integrally cast with the standard, one of which is longer than the other. These ribs may be of any desired shape in cross-section.

C C are plates provided with paddles $c$ $c$. The two upper paddles $c$ $c$ are provided with perforated lugs $c'$ $c'$. These plates C are formed to fit and slide on the ribs $b^2$, as best seen in Fig. 4.

D is a scraping bar or paddle pivoted in the usual manner.

E is the cover for the cream-receptacle, provided with apertures, into which, when necessary, may be inserted the pin $e$, which extends into the cream-receptacle. I also provide the cover with two ventilating-tubes G and H, the tube H just extending through said cover and the tube G extending some distance below the same, in order to create a circulation, thus permitting the escape of odors arising from the use of poor cream, and to break the air-cushion that is at the top of freezers in general use, thereby permitting the cream to be more thoroughly worked, thus producing a superior cream. It is obvious that the pin $e$ may be inserted either in the tube or the aperture. Consequently one or the other may be used, or both, as found most desirable.

Secured to the standard and near the top of the cream-receptacle are spring-arms $e^2$ $e^2$, provided with hooks on their respective outer ends, said hooks engaging when desired the perforated lugs $c'$ $c'$.

$b^3$ $b^3$ are ribs on the ends of the lugs $b^2$ $b^2$.

The operation is as follows: Before placing the dasher in the can I raise the sliding plates C C and fasten the hooks of the arms $e^2$ into the perforated lugs $c'$ $c'$. I then place the dasher in the can and start the machine. The scraper D scrapes the cream from the sides of the can as it freezes, and aside from the scraper the cream is not agitated at all. Consequently it freezes much quicker than it otherwise would. As soon the cream is frozen to a certain degree of solidity I drop the pin $e$ through the aperture in the cover E. The machine, continuing to revolve, carries the pin around, and it strikes against the arms $e^2$ and disengages them from the sliding plates, which upon being released drop down to their respective places at the bottom of the dasher against the pins $b^3$ $b^3$.

What I claim, and desire to secure by Letters Patent, is—

1. In a receptacle, a dasher having movable paddles adapted to be thrown into and out of position without being removed from the receptacle.

2. A dasher having an axis, ribs integrally cast thereon, and movable paddles adapted to slide on said ribs, substantially as described.

3. A dasher having an axis, ribs integrally cast thereon, movable paddles mounted thereon, and means for holding said movable paddles up out of position, substantially as described.

4. A dasher having an axis, movable paddles, means for holding said paddles out of position, and a pin adapted to disengage said means from the paddles, thereby permitting them to drop into position, substantially as described.

5. In an ice-cream freezer, the combination, with a dasher having movable paddles and means for holding said paddles out of position, of a cover or lid having an opening and a pin adapted to pass through said opening, substantially as described.

6. A dasher having an axis, ribs integrally cast thereon, movable paddles adapted to engage said lugs, and means for holding said paddles out of position, and the pins $b^3$ for limiting the downward movement of said paddles, substantially as described.

In testimony whereof I affix my signature in presence of two witnesses.

THOMAS S. LEWIS.

Witnesses:
HARRY E. BUCHER,
HARRY C. GRIFFITH.